(12) United States Patent
Henderson

(10) Patent No.: US 7,738,638 B1
(45) Date of Patent: Jun. 15, 2010

(54) VOICE OVER INTERNET PROTOCOL CALL RECORDING

(75) Inventor: Donnie Henderson, Manalapan, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 967 days.

(21) Appl. No.: 11/099,061

(22) Filed: Apr. 5, 2005

(51) Int. Cl.
H04M 1/64 (2006.01)

(52) U.S. Cl. .................... 379/88.17; 370/354

(58) Field of Classification Search .............. 379/88.17; 370/352–356
See application file for complete search history.

(56) References Cited

U.S. PATENT DOCUMENTS

| | | | |
|---|---|---|---|
| 6,529,602 B1 * | 3/2003 | Walker et al. ............... | 380/283 |
| 6,795,534 B2 * | 9/2004 | Noguchi ................... | 379/88.17 |
| 7,054,420 B2 * | 5/2006 | Barker et al. .............. | 379/88.25 |
| 7,227,930 B1 * | 6/2007 | Othmer et al. ................ | 379/85 |
| 2005/0114116 A1 * | 5/2005 | Fiedler ....................... | 704/201 |

* cited by examiner

Primary Examiner—Simon Sing

(57) ABSTRACT

Disclosed is a method and apparatus for VoIP call recording. A call control network element monitors an existing telephone call for a call recording request from one of the parties. Upon receipt of the request, a determination is made as to whether recording is authorized. This determination may be made, for example, by sending a permission request message to the non-requesting party and waiting for receipt of a permission message from the non-requesting party. Alternatively, the authorization determination may be made by accessing a database storing call recording authorization information whereby subscribers can pre-authorize certain types of recording in order to expedite the authorization determination during an actual call. If authorized, the data packets implementing the voice data stream between the parties are duplicated, and the duplicate data packets are sent to a media server to record the call.

14 Claims, 3 Drawing Sheets

VOICE OVER INTERNET PROTOCOL CALL RECORDING

BACKGROUND OF THE INVENTION

The present invention relates generally to telephone call recording, and more particularly to call recording in a voice over internet protocol network.

One or more parties to a telephone call often desire to record all, or a portion, of the call. One simple technique for such recording is for one of the parties to the call to record the conversation at a recording device located at the customer premises. However, there are certain problems with this technique. First, there are privacy considerations that must be taken into account prior to one party to a call unilaterally recording the conversation. In many instances, it is desirable and/or required to have all parties to a call consent to recording before recording commences. As such, it is undesirable to record without verifiable proof of consent from all parties. Another problem with unilateral recording is that the recording is not secure, and may be tampered with by the recording party. Thus, a recording made using equipment at a customer premises may not be reliable as an accurate documentation of the actual conversation between the parties.

Attempts have been made at solving some of these problems. For example, U.S. Pat. No. 6,529,602 discloses in-network call recording at a public switched telephone network (PSTN) node. That system utilizes a network node within a circuit switched telephone network in order to provide a secure location for stored recorded conversations. That system also provides for requesting recording permission from the call participants. The system described in the aforementioned '602 patent, however, is disadvantageous in that the parties to the call are connected to the recording node via two separate telephone connections. Thus, the parties must each establish a separate connection with the node, and then the node bridges the separate connections together in order connect the parties and record the conversation. One problem with this system is that the parties must know before the call is initiated that they want the call to be recorded. Such a system cannot be used to record a call if the participants decide to record the call after a normal telephone call is setup.

While the PSTN has been in existence for many years, more recently, data packet networks, such as local area networks (LAN) and wide area networks (WAN) have become more prevalent. These data networks operate in accordance with the internet protocol (IP) and such networks are referred to as IP networks. The popularity of IP networks has created an interest in providing voice and related services over IP networks. The provisioning of voice and related services over an IP network is referred to as voice over IP (VoIP).

Conventional PSTN voice services dedicate a circuit connection between a calling and called party. IP networks, on the other hand, are shared networks in which the network resources are shared between users. The notion of a connection in a data packet network is very different from the notion of a connection in a circuit network. In a circuit network, the connection is a dedicated circuit which is used only by the calling and called parties and is used for the duration of the call. In a data network, the connection between two parties is not dedicated, and traffic between the parties is transmitted via the data packet network along with the data packets of other users. There is no dedicated path between the parties, and data packets may be transmitted between the parties via different paths, depending upon network traffic.

BRIEF SUMMARY OF THE INVENTION

The present invention takes advantage of the flexibility of VoIP calls and a data network in order to provide an advantageous method and apparatus for call recording.

In one embodiment, recording of a VoIP call is initiated when a party to the call sends a request message to the network. Upon receipt of a data packet indicating such a request, a determination is made to determine whether call recording is authorized. This determination may be made, for example, by sending a permission request message to the non-requesting party and waiting for receipt of a permission message from the non-requesting party. Alternatively, the authorization determination may be made by accessing a database storing call recording authorization information whereby subscribers can pre-authorize certain types of recording in order to expedite the authorization determination during an actual call. Upon a determination that call recording is authorized, data packets implementing the voice data stream between the parties are duplicated, and the duplicate data packets are sent to a recording network element. The call is then recorded at the recording network element. The recording may be implemented such that the audio from one or more call participants may be retrieved for later replay.

Various additional features of call recording may be implemented by making use of the flexible protocol provided by a VoIP system. For example, any party to the call may terminate recording by sending an appropriate call recording termination message. Further, even if one party to the call drops off the call, the voice data packets containing the voice data of the other party may continue to be transmitted to the recording network element so that the non-dropped party may continue to record and the dropped party may retrieve such continued recording at a later time. In one embodiment, the telephone devices may comprise a dedicated keypad key, or sequence of keys, which can toggle the call recording feature on or off.

In one embodiment, the invention is implemented using a call control network element which monitors an existing telephone call for a call recording request from one of the parties. A media server network element is used for recording the call in an internal storage device and also for sending appropriate announcements to the parties, for example to request recording permission and to notify the parties that recording has been initiated or terminated. A database may be used to store identification of subscribers to the call recording service, as well as recording authorization information for use in determining whether call recording is authorized.

These and other advantages of the invention will be apparent to those of ordinary skill in the art by reference to the following detailed description and the accompanying drawings.

DETAILED DESCRIPTION

Figure 1:
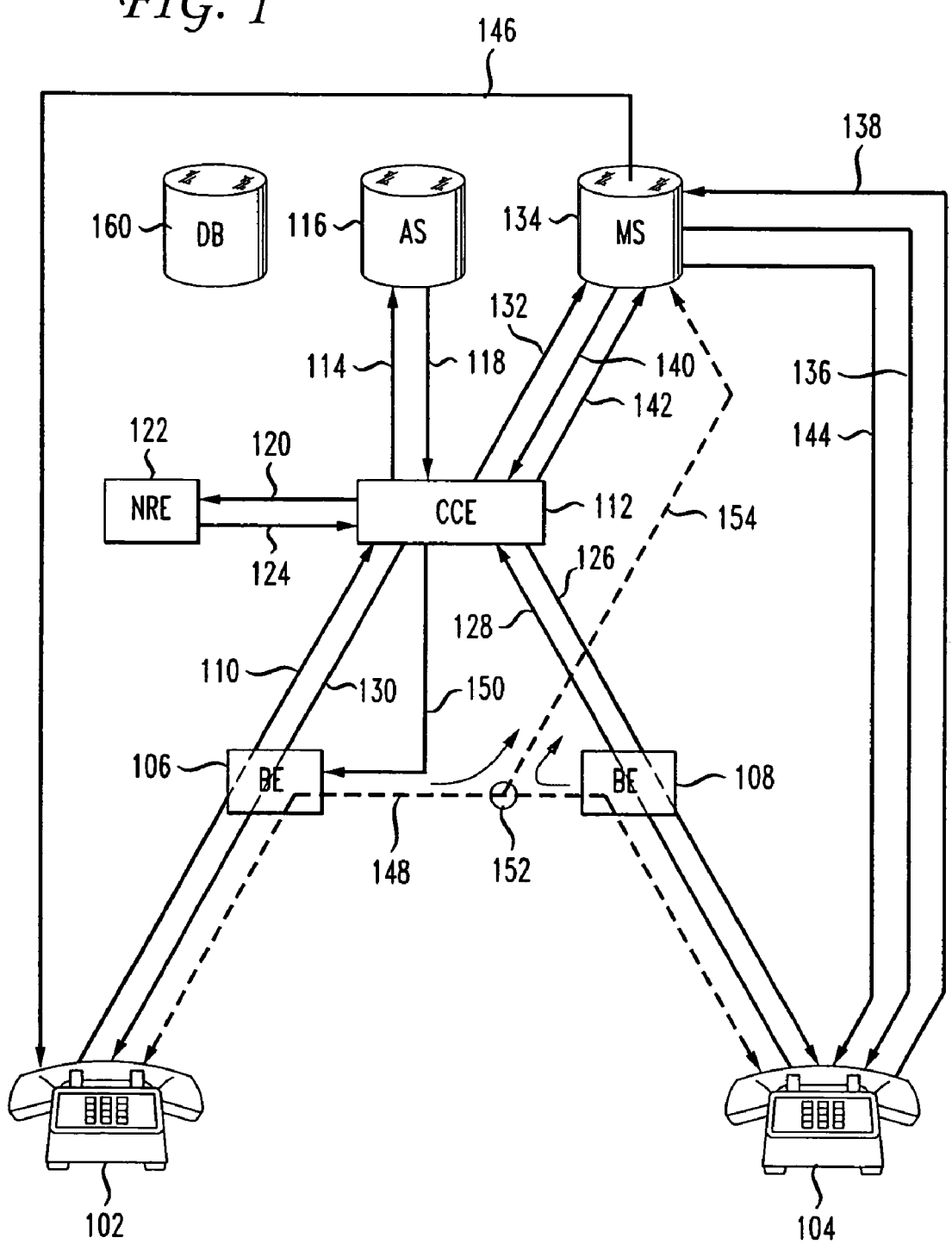
FIG. 1 shows an IP network in which one embodiment of the present invention may be implemented.

FIG. 1 shows an IP network in which one embodiment of the present invention may be implemented. The network may utilize the Session Initiation Protocol (SIP) in order to set up connections (e.g., VoIP calls) between users. SIP is a well known application-layer control protocol used to establish, modify and terminate sessions such as IP telephony calls. SIP is described in detail in Internet Engineering Task Force (IETF) Request for Comments (RFC) 3261; SIP: Session. Initiation Protocol; J. Rosenberg, H. Schulzrinne, G. Camarillo, A. Johnston, J. Peterson, R. Sparks, M. Handley, E. Schooler; June 2002, which is incorporated by reference herein. The details of SIP will not be described herein, as the protocol is well known to those skilled in the art. The protocol will be described only insofar as necessary for an understanding of the present invention.

With reference to FIG. 1, it is to be understood that the network elements shown in FIG. 1 are logical entities. Such logical entities may be implemented in various hardware configurations. For example, these network elements may be implemented using programmable computers which are well known in the art. Such programmable computers would have the required network interfaces to allow for network communication, as well as appropriate software for defining the functioning of the network elements. Such software is executed on one or more computer processors which control the overall operation of the network elements via execution of such software. The detailed hardware and software configuration of the network elements will not be described in detail herein. One skilled in the art of data networking and computers could readily implement such network elements given the description herein. As used herein, a network element refers to a logical entity which performs a network function. A network node refers to the computing platform on which a network element is implemented.

Referring now to FIG. 1, the basics of an embodiment of VoIP call set-up will be described. Assume that IP enabled telephone 102 wishes to initiate an IP telephony call to IP enabled telephone 104. In FIG. 1, telephone 102 is connected to a border element (BE) 106 which provides telephone 102 access to the IP network. Similarly, telephone 104 is connected to BE 108 which provides telephone 104 access to the IP network. In the example of FIG. 1, the transaction begins by telephone 102 initiating a call request by sending an SIP INVITE request 110 addressed to telephone 104's Uniform Resource Identifier (URI) which identifies telephone 104. The details of an INVITE are well known and will not be described in detail herein.

The INVITE message 110 is received at the call control element (CCE) 112. The CCE 112 controls overall call set-up and interfaces with other network elements such as Border Elements, Service Brokers (SB), Application Servers (AS), Media Servers (MS), Network Routing Engines (NRE), and others, to provide the necessary functions to process a call request. As described above, the present invention provides for advantageous recording of VoIP calls by taking advantage of the unique properties and architecture of VoIP networks. As such, during call setup, the CCE 112 determines whether special call recording processing is required by the call based on the information it receives in the incoming call request. The CCE 112 may make this determination, for example, based on a special identifier in the call request. Alternatively, the CCE 112 may make this determination based upon the identity of the telephone 102. For example, the subscriber associated with telephone 102 may have a subscription to call recording services, such that each time a call is made from telephone 102, the CCE determines (e.g., based upon a database 160 lookup) that the call is to receive call recording processing. Upon a determination that special call recording feature processing is required, the CCE 112 sends a query (an SIP INVITE) 114 to the appropriate application server (AS), for example AS 116. The AS 116 performs the required feature processing and returns message 118 that informs CCE112 that the AS116 has readied the recording element to be patched in when the call goes active (as described in further detail below). At this point in the processing, the CCE 112 knows that this call is to be provided with special call recording processing, as will be described in further detail below.

Next, based on the information in the INVITE, the CCE 112 sends a request message 120 to the network routing engine (NRE) 122 to determine the IP address of the appropriate BE for further routing. The NRE 122 returns the requested information by message 124. It is noted that the NRE 122 is shown as a separate logical network element in the network of FIG. 1. In various embodiments, the NRE function may be implemented on the same network node as the CCE 112 or on a separate network node.

Upon receipt of the address of the appropriate BE (in this case BE 108), CCE 112 forwards the INVITE message 126 to telephone 104 via BE 108. The telephone 104 accepts the call by sending an OK message 128 back to the CCE 112. The CCE 112 forwards the OK message 130 to telephone 102 via BE 106. The VoIP call between telephone 102 and telephone 104 is now set up with the special call recording processing. There is now a voice data stream 148 between telephone 102 and telephone 104. The data stream 148 is shown in FIG. 1 as a direct data stream between border element 106 and border element 108, but one skilled in the art will recognize that the data packets implementing the VoIP data stream 148 may be routed through any number of network elements in addition to border elements 106 and 108. Further the data packets may traverse different network elements at different times during the call, and the data packets from telephone 102 to telephone 104 may traverse a network path different than the path traversed by data packets from telephone 104 to telephone 102. Thus, voice data stream 148 illustrates a logical voice data stream between telephone 102 and telephone 104.

The above description is a high level overview of call processing in an IP network using SIP. One skilled in the art will recognize that there are various ways of setting up a call, and that in an actual network implementation, there would likely be additional network element involved in call setup as well as additional messages passed between the elements.

Figure 2:
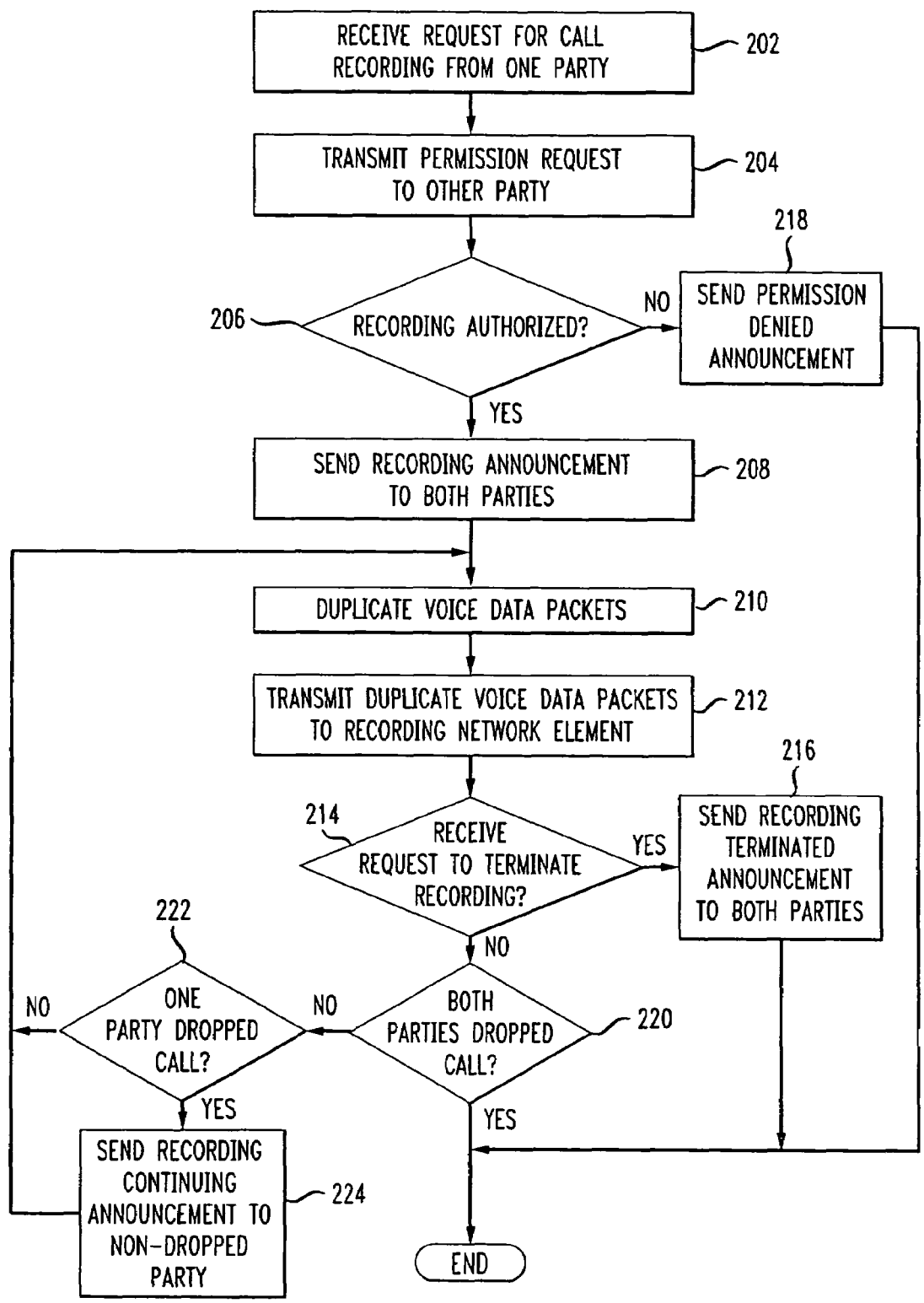
FIG. 2 shows a flowchart illustrating the steps performed by the VoIP network in accordance with one embodiment of the invention.

As described above, at this point the call is set up and is being provided with special call recording processing. Such processing will now be described in conjunction with FIG. 2, which shows a flowchart illustrating the steps performed by the VoIP network in accordance with one embodiment of the present invention. First, in step 202, the CCE 112 receives a request for call recording from one of the parties, for example telephone 102. This request may be, for example, one or more dual tone multi-frequency (DTMF) tones initiated by a user of telephone 102 pressing one or more keys on the telephone keypad. Alternatively, the request may be a verbal request if the CCE 112 is configured for voice recognition. Regardless of the form of the request, since the call has been set up with special call recording processing, the CCE 112 is monitoring the call for the call recording request from one of the call participants. Upon receipt of the call recording request, the CCE 112 will recognize that call recording processing is required and will send a message to AS 116, where AS 116 is the appropriate network application server which has been configured to provide the call recording service logic necessary for the service. Thus, the steps described below in conjunction with FIG. 2 are defined by the application logic stored as computer program code in application server 116. AS 116 therefore provides the appropriate logic to CCE 112 so that the CCE 112 may provide the special call recording services.

After receipt of the call recording request from one of the parties, in step 204 a call recording permission request is transmitted to the other party. As described above, it is desirable to obtain permission from all parties to a call prior to initiating the call recording. In one embodiment, the CCE 112 sends a message 132 to interactive voice response (IVR)/media server 134 (hereinafter MS) to initiate a recording sent from MS 134 to telephone 104 containing the permission request. MS 134 sends an audio recording to telephone 104 as represented by 136. The user of telephone 104 may transmit a permission message granting permission to record the call by DTMF tones or by verbal request, similar to the request for recording described above. The permission message, if initiated by the user of telephone 104, is transmitted to MS 134 as represented by 138. It is noted that the communication between MS 134 and telephone 104 would be via data packets through the VoIP network, and not via direct communication. However, the communication between the two devices is shown in FIG. 1 as 136 and 138 for ease of illustration.

Returning now to FIG. 2, it is determined in step 206 whether call recording is authorized. In one embodiment, CCE 112 will be notified of call recording permission via a message 140 from MS 134 in response to the MS 134 receiving permission message 138. Thus, if permission is received, then it is determined in step 206 that call recording is authorized. In an alternate embodiment, call recording authorization information may be stored in user profiles in the network, for example in database 160. For example, such pre-stored authorization may indicate that a particular subscriber (e.g., subscriber associated with telephone 104) always authorizes recording, or authorizes recording if the other call participant(s) is a particular pre-identified call participant(s) or class of call participant. In this alternate embodiment, step 204 would be replaced by a database lookup in order to retrieve the information required to determine whether recording is authorized in step 206.

If recording is authorized, then in step 208 a recording announcement is sent to both parties to the call to indicate that recording has been initiated. In the embodiment shown in FIG. 1, the announcement is initiated by CCE 112 sending a message 142 to MS 134 to initiate a recording sent from MS 134 to telephones 102 and 104 containing the recording announcement. The MS 134 sends the announcement to telephones 102 and 104 as represented by 146 and 144. Again, it is pointed out that communication between MS 134 and telephones 102 and 104 would be via data packets through the VoIP network, and not via direct communication. However, the communication between the devices is shown in FIG. 1 as a direct connection for ease of illustration.

After the recording announcement is made to the parties, call recording may begin. In step 210 the voice data packets implementing the voice data stream 148 are duplicated, and in step 212 the duplicated voice data packets are sent to a recording network element, for example MS 134. In further detail, upon a determination that call recording permission has been received, the CCE 112 sends a message to one or more network elements indicating that the voice packets implementing the voice data stream 148 are to be duplicated and transmitted to the MS 134. This duplication of voice packet does not interfere with the voice data stream 148 of the call, but instead results in a duplicate data stream being sent to MS 134. MS 134 records the received duplicate data stream for example on an internal digital storage device. The logical duplication of the voice data stream 148 is represented in FIG. 1 at point 152, and the duplicate data stream is represented as data stream 154 being sent to MS 134. It is to be understood that the actual duplication of data packets may be implemented in various ways. For example, CCE 112 may implement such duplication by sending a duplication message to one network element through which all data packets must pass. For example, either BE 106 or BE 108 may duplicate the data packets implementing the voice data stream 148 because all such data packets must pass through each of these network elements. Alternatively, the data packet duplication may be implemented by two or more network elements through which the data packets pass. The only requirement is that all data packets be duplicated, at one or more network elements, such that a complete duplicate voice data stream 154 may be sent to MS 134 for recording.

The duplicate voice data stream may be stored in MS 134 in various ways. The voice data stream may be stored as a single data object so that the audio from all call participants is stored in the single data object. Alternatively, the audio from the different call participants could each be stored as separate time-correlated storage objects so that they could be retrieved separately. Since the stored audio is time-correlated, the multiple stored data objects could be combined to recreate the entire audio conversation or any portion thereof. This alternate embodiment allows for more flexibility when retrieving and replaying the stored audio and could be useful, for example, for later transcription, voice to text conversion, or other services.

Returning now to FIG. 2, the duplication of data packets (step 210) and transmission to MS 134 (step 212) continues until it is determined in step 214 that one of the parties has requested to terminate call recording or until both parties drop from the call (step 220) as described below. A request to terminate call recording may be transmitted to the CCE 112 in a manner similar to that described above in connection with either the original recording request or the permission message. Upon a determination in step 214 that a party has requested call recording termination, a call recording termination announcement is played to each party in step 216 and the process ends. Similarly, if it is determined in step 206 that call recording permission was denied, then a call recording permission denied announcement is played to each party in step 218 and the process ends. If it is determined in step 214 that neither party has requested recording termination, then it is determined in step 220 whether both parties have dropped from the call. If so, then the process ends. If both parties have not dropped from the call, then it is determined in step 222 whether one party has dropped from the call. If not, then the duplication of data packets (step 210) and transmission to MS 134 (step 212) continues. If one of the parties has dropped from the call, then in step 224 an announcement is played to the other party, indicating that call recording will continue, and the duplication and transmission of the duplicate data packets continues. This continuation of recording allows the non-dropped party to leave a message for the dropped party, which message may be retrieved from MS 134 by the dropped party at a later time. The announcements of steps 216, 218 and 224 may be implemented in a manner similar to that described above in conjunction with the announcement of step 208, by the CCE 112 initiating appropriate announcements via a message to MS 134.

Figure 3:
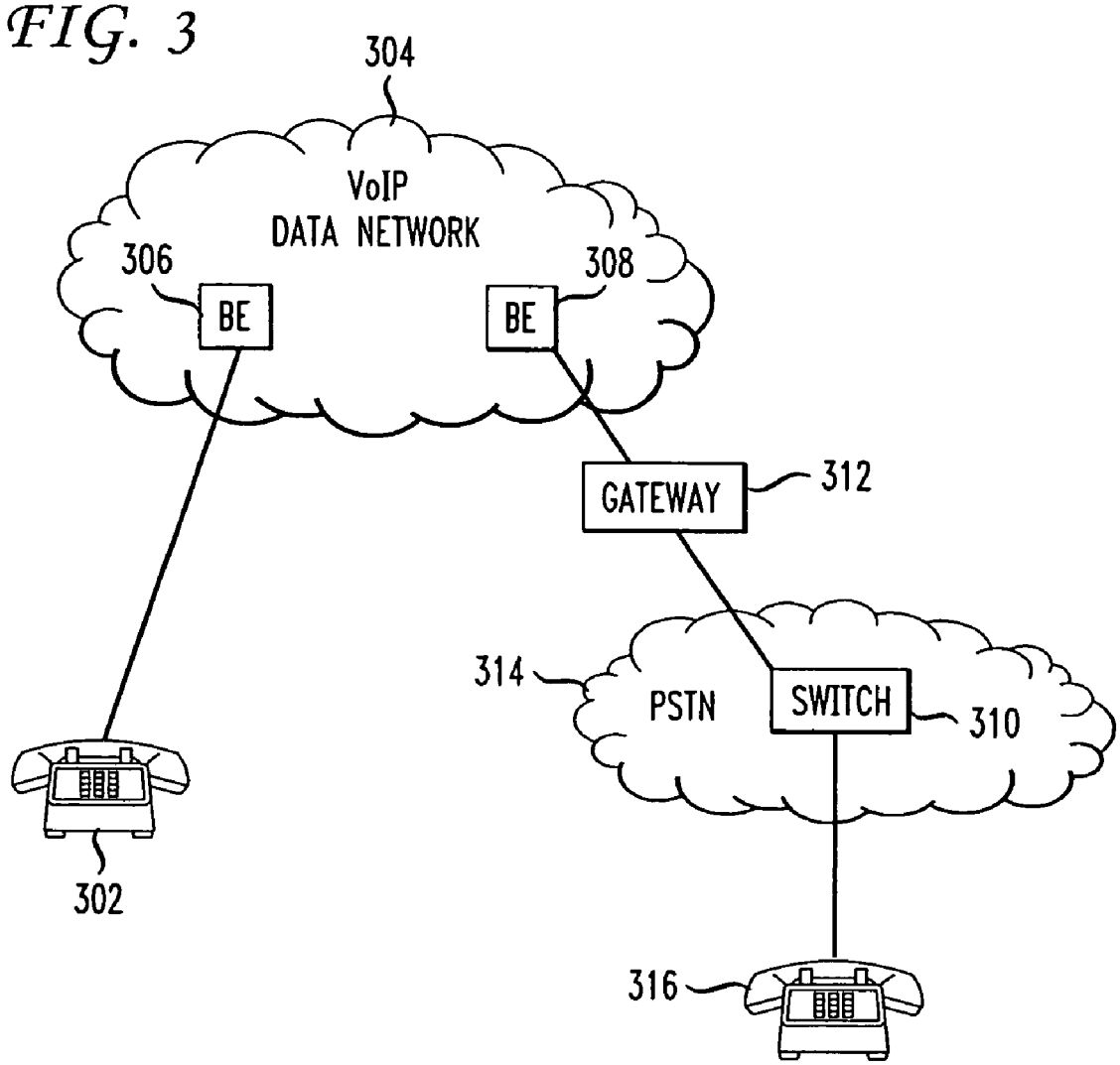
FIG. 3 shows an embodiment in which one telephone is a VoIP enabled device and the other telephone is a standard PSTN telephone.

It is noted that the embodiment described above assumes that both telephones 102 and 104 are VoIP enabled devices directly connected to the VoIP data network. FIG. 3 shows an alternate embodiment in which one telephone 302 is a VoIP enabled device directly connected to the VoIP data network 304 via BE 306. The other call participant is using standard PSTN telephone 316 which is connected to a telephone company central office switch 310 in PSTN 314 in a conventional manner. In this embodiment, the central office switch 310 connects to a gateway 312 network element which provides translation services for converting the analog signals from telephone 316 to VoIP data packet format for transmission to the VoIP data network via BE 308. Conversely, gateway 312 converts voice data packets from the VoIP network 304 into standard analog telephone signals for transmission to telephone 316 via PSTN 314. One skilled in the art will recognize that gateway 312 would also provide other conversion services, such as signaling services, in order to connect PSTN telephone 316 to VoIP data network 304. Such gateways and conversion functions are well known in the art and will not be described in further detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. For example, while the above described embodiments generally describe a telephone call between two parties, the principles of the present invention could be applied to a call with any number of parties. Further, there are various techniques for initiating the call recording/termination requests from the telephones. For example, in one embodiment, a telephone may utilize a particular button or sequence of buttons on the keypad to toggle recording on and off.

The invention claimed is:

1. A method for recording a voice-over-IP call between a first party and a second party wherein voice data is transmitted via voice data packets, said method comprising the steps of:
   receiving a data packet indicating a request for call recording from said first party;
   in response to said request, determining whether call recording is authorized for the call by accessing a database of stored call recording authorization information of said second party, said recording authorization information including authorization received from said second party;
   if call recording is authorized, duplicating said voice data packets and transmitting said duplicate data packets to a recording network node;
   receiving from said second party a data packet indicating a request to terminate call recording; and
   terminating said step of duplicating said voice data packets and transmitting said duplicate data packets to a recording network node.

2. The method of claim 1 wherein said data packet indicating a request to terminate call recording is received from said first party.

3. The method of claim 1 further comprising the steps of:
   determining that one of said first party or second party has dropped from the call;
   transmitting a message to the non-dropped party indicating that the other party has dropped from the call; and
   continuing to duplicate voice data packets from said non-dropped party and to transmit said duplicated voice data packets to said recording network node.

4. The method of claim 1 wherein said request for call recording is initiated by said first party by pressing a dedicated key on a telephone device.

5. The method of claim 1, wherein said authorization from said second user is only with respect to a particular call participant.

6. A system for recording a voice-over-IP call between a first party and a second party wherein voice data is transmitted via voice data packets, said system comprising:
   means for receiving a data packet indicating a request for call recording from said first party;
   means for determining whether call recording is authorized for the call in response to said request by accessing a database of stored call recording authorization information of said second party, said recording authorization information including authorization received from said second party;
   means for duplicating said voice data packets and transmitting said duplicate data packets to a recording network node if call recording is authorized;
   means for receiving from said second party a further data packet indicating a request to terminate call recording; and
   means for terminating said step of duplicating said voice data packets and transmitting said duplicate data packets to a recording network node.

7. The system of claim 6 further comprising:
   means for determining that one of said first party or second party has dropped from the call;
   means for transmitting a message to the non-dropped party indicating that the other party has dropped from the call; and
   means for continuing to duplicate voice data packets from said non-dropped party and to transmit said duplicated voice data packets to said recording network node.

8. The system of claim 6, wherein said authorization from said second user is only with respect to a particular call participant.

9. A system for recording a voice-over-IP call between a first party and a second party wherein voice data is transmitted via voice data packets, said system comprising:
   a call control element for monitoring said call and detecting when said first or second party requests call recording;
   a media server comprising a storage device for recording calls;
   a database storing call recording authorization information of said second party, said recording authorization including authorization received from said second party; and
   at least one network node for duplicating said voice data packets and transmitting said duplicate voice data packets to said media server for recording in response to a message received from said call control element;

wherein said call control element is configured to receive from said second party a further data packet indicating a request to terminate call recording; and wherein said at least one network node is configured to terminate said step of duplicating said voice data packets and transmitting said duplicate voice data packets to said media server.

10. The system of claim 9 wherein said at least one network node comprises a plurality of network nodes.

11. The system of claim 9 further comprising a database storing identification of subscribers to a call recording service.

12. The system of claim 9 wherein said media server is configured to store audio originating from said first party and audio originating from said second party as separate data objects that are separately retrievable.

13. The system of claim 12 wherein said separate data objects are time-correlated.

14. The system of claim 9, wherein said authorization from said second user is only with respect to a particular call participant.

* * * * *